(12) United States Patent
Suehiro et al.

(10) Patent No.: US 6,961,185 B2
(45) Date of Patent: Nov. 1, 2005

(54) MICROLENS ARRAY

(75) Inventors: Ichiro Suehiro, Osaka (JP); Naoki Sadayori, Osaka (JP); Yuji Hotta, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/757,512

(22) Filed: Jan. 15, 2004

(65) Prior Publication Data

US 2004/0167310 A1 Aug. 26, 2004

(30) Foreign Application Priority Data

Jan. 17, 2003 (JP) ........................ P.2003-010408

(51) Int. Cl.$^7$ .................... G02B 27/10; G02B 3/00; G03B 21/60; G08G 63/00; B29D 11/00

(52) U.S. Cl. .................. 359/620; 359/619; 359/642; 359/648; 359/455; 528/176; 528/310; 264/1.1; 264/1.36

(58) Field of Search ................... 359/619, 620, 359/642, 648, 455, 599; 528/176, 170, 44, 310; 264/1.1, 1.36, 2.5

(56) References Cited

U.S. PATENT DOCUMENTS

| | | |
|---|---|---|
| 4,225,698 A | 9/1980 | Medem et al. |
| 6,411,439 B2 * | 6/2002 | Nishikawa ............ 359/619 |
| 6,432,328 B2 * | 8/2002 | Hamanaka et al. ....... 264/1.36 |
| 6,437,918 B1 * | 8/2002 | Hamanaka et al. ......... 359/620 |
| 6,597,509 B2 * | 7/2003 | Takakuwa et al. ......... 359/619 |

FOREIGN PATENT DOCUMENTS

| | | |
|---|---|---|
| JP | 06-208005 A | 7/1994 |
| JP | 11-211902 A | 8/1999 |
| JP | 2000-275405 A | 10/2000 |
| JP | 2000-304906 A | 11/2000 |
| JP | 2000-321675 A | 11/2000 |
| JP | 2000-2803 A | 1/2001 |
| JP | 2001-272507 A | 10/2001 |

OTHER PUBLICATIONS

Patent Abstracts of Japan—9 059338, vol. 1997, No. 07.
Patent Abstracts of Japan—6 059102, vol. 0182, No. 95.
Patent Abstracts of Japan—10 020295, vol. 1998, No. 05.
European Search Report dated Apr. 27, 2004.

* cited by examiner

*Primary Examiner*—Loha Ben
(74) *Attorney, Agent, or Firm*—Sughrue Mion, PLLC

(57) ABSTRACT

A microlens array having a resin layer forming convex lenses, wherein the resin layer comprises a cured product of a polycarbodiimide resin represented by formula:

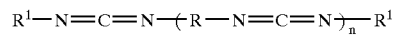

wherein R represents a diisocyanate residue; $R^1$ represents a monoisocyanate residue; and n represents an integer of 1 to 100.

9 Claims, 3 Drawing Sheets

MICROLENS ARRAY

FIELD OF THE INVENTION

This invention relates to a microlens array.

BACKGROUND OF THE INVENTION

FIG. 1 shows an example of a planar microlens array in which an array of large number of tiny convex lenses and an array of large number of tiny concave lenses form a layered structure. The microlens array has a high refractive resin layer 2 and a low refractive resin layer 3, laminated one on the other, between transparent substrates 1 made of, e.g., glass plate.

Usually, a layer serving as a concave lens function is constituted by a low refractive resin, while a layer serving as a convex lens function is constituted by a high refractive resin.

Such microlens arrays are used in optoelectronic equipment such as CCD, liquid crystal projectors, camcorders, viewfinders, and portable TV sets.

Conventional high refractive resins known to be practically useful in the microlens arrays include ultraviolet-curing acrylic resins and epoxy resins, the refractive indices of which ranges about 1.57 to 1.68. Various microlens arrays using these resins have been proposed to date as disclosed, e.g., in JP 2000-2803 A (page 3), JP 2001-272507 A (page 5), and JP 2000-321675 A (pages 3–4).

SUMMARY OF THE INVENTION

The present invention has been made based on a conception that the thickness of a microlens could be reduced according as the refractive index of a high refractive resin layer increases to make the refractive index difference from a low refractive resin layer larger.

Accordingly, an object of the present invention is to provide a microlens array with a reduced thickness by using a high refractive resin layer having an increased refractive index.

Other objects and effects of the invention will become apparent from the following description.

The above-described objects of the invention have been achieved by providing the following microlens arrays:

(1) A microlens array having a resin layer forming convex lenses, wherein the resin layer comprises a cured product of a polycarbodiimide resin represented by formula:

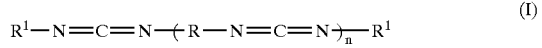

$$R^1-N=C=N-(R-N=C=N)_n-R^1 \quad (I)$$

wherein R represents a diisocyanate residue; $R^1$ represents a monoisocyanate residue; and n represents an integer of 1 to 100;

(2) The microlens array according to item (1) above, wherein the resin layer has a refractive index of 1.70 or greater;

(3) The microlens array according to item (1) or (2) above, wherein the diisocyanate residues comprises aromatic diisocyanate residues in an amount of 10 mol % or higher;

(4) The microlens array according to item (1) or (2) above, wherein the diisocyanate residues comprises at least one member selected from the group consisting of a tolylene diisocyanate residue, a 4,4'-diphenylmethane diisocyanate residue, and a naphthalene diisocyanate residue;

(5) The microlens array according to any one of items (1) to (4) above, wherein the monoisocyanate residues are aromatic monoisocyanate residues;

(6) The microlens array according to item (5) above, wherein the aromatic monoisocyanate residues are 1-naphthyl isocyanate residues.

DETAILED DESCRIPTION OF THE INVENTION

Figure 1:
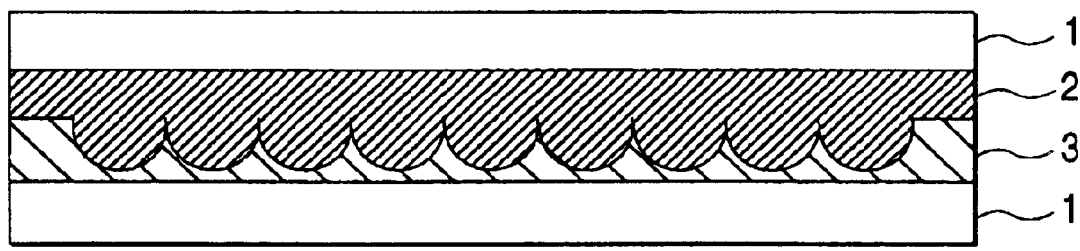
FIG. 1 is a cross-section showing an example of the microlens array according to the present invention.

The convex lens layer of the microlens array according to the present invention is a high refractive resin layer comprising a cured product of a polycarbodiimide represented by formula (I). The polycarbodiimide is obtained by condensing one or more kind of diisocyanate compounds and blocking the terminals with a monoisocyanate compound.

In formula (I), the residue R is derived from the starting diisocyanate, and the residue $R^1$ is derived from the starting monoisocyanate. The symbol n represents an integer of 1 to 100.

The starting compounds, diisocyanate and monoisocyanate, may be either aromatic or aliphatic, or may be a mixture of an aromatic compound and an aliphatic compound. Aromatic compounds are preferred for obtaining higher refractive indices. In other words, it is desirable that at least one of the diisocyanate and the monoisocyanate comprise or be aromatic one, or both be aromatic ones. It is more desirable that the diisocyanate comprises aromatic one and aliphatic one with the monoisocyanate being aromatic. It is most desirable that both the diisocyanate and the monoisocyanate be aromatic.

The diisocyanate compounds which can be used in the invention include hexamethylene diisocyanate, dodecamethylene diisocyanate, 2,2,4-trimethylhexamethylene diisocyanate, 4,4'-dicyclohexylmethane diisocyanate, xylylene diisocyanate, tetramethylxylylene diisocyanate, isophorone diisocyanate, cyclohexyl diisocyanate, lysine diisocyanate, methylcyclohexane-2,4'-diisocyanate, 4,4'-diphenylmethane diisocyanate, 4,4'-diphenyl ether diisocyanate, 2,6-tolylene diisocyanate, 2,4-tolylene diisocyanate, naphthalene diisocyanate, 1-methoxyphenyl-2,4-diisocyanate, 3,3'-dimethoxy-4,4'-diphenylmethane diisocyanate, 3,3'-dimethyl-4,4'-diphenyl ether diisocyanate, 2,2-bis[4-(4-isocyanatophenoxy)phenyl]hexafluoropropane, and 2,2-bis[4-(4-isocyanatophenoxy)phenyl]propane.

From the standpoint of high refractive index and ease of refractive index control, it is preferred to use at least one diisocyanate compound selected from the group consisting of tolylene diisocyanate, 4,4'-diphenylmethane diisocyanate, and naphthalene diisocyanate. Naphthalene diisocyanate is particularly preferred.

These diisocyanate compounds can be used either singly or as a mixture of two or more thereof.

The starting diisocyanate preferably comprises an aromatic diisocyanate in an amount of 10 mol % or higher (upper limit thereof being 100 mol %). The diisocyanate compound(s) to be used is/are preferably chosen from among those recited above.

The monoisocyanate compounds for use in the invention include cyclohexyl isocyanate, phenyl isocyanate, n-nitrophenyl isocyanate, p- and m-tolyl isocyanate, p-formylphenyl isocyanate, p-isopropylphenyl isocyanate, and 1-naphthyl isocyanate.

Preferred of these monoisocyanate compounds are aromatic ones for their inert self-reactivity and capability of efficiently blocking the terminals of polycarbodiimide. 1-Naphthyl isocyanate is particularly preferred.

These monoisocyanate compounds can be used either singly or as a mixture of two or more thereof.

The monoisocyanate for terminal blocking is preferably used in an amount of 1 to 10 mol per 100 mol of the diisocyanate. When the amount of the monoisocyanate is 1 mol or more per 100 mol of the diisocyanate, the polycarbodiimide is prevented from excessively increasing its molecular weight or crosslinking. As a result, the resulting polycarbodiimide solution has a moderate viscosity and is prevented from solidification or deterioration in storage stability. When the amount of the monoisocyanate is 10 mol or less per 100 mol of the diisocyanate, the viscosity of the resulting polycarbodiimide solution will be moderate for, for example, applying to a substrate and drying to form a film. A blocked polycarbodiimide solution obtained by using the monoisocyanate at the above-recited molar ratio is particularly excellent in storage stability.

The polycarbodiimide according to the invention can be prepared by condensing a diisocyanate in a solvent in the presence of a catalyst for carbodiimidation and blocking the terminals of the resulting carbodiimide with a monoisocyanate.

The condensation of the diisocyanate is carried out usually at 0° to 150° C., preferably 10° to 120° C.

In the case of using a mixture of an aliphatic diisocyanate compound and an aromatic diisocyanate compound, the condensation is preferably effected at a relatively low temperature, typically 0° to 50° C., preferably 10° to 40° C., whereby condensation between the aliphatic and the aromatic diisocyanate compounds proceeds sufficiently.

Where it is demanded that an excess aromatic diisocyanate present in the reaction system should be allowed to further react with a polycarbodiimide comprising the aliphatic diisocyanate component and the aromatic diisocyanate component, the reaction temperature is preferably 40° to 150° C., still preferably 50° to 120° C. Within that temperature range, the reaction proceeds smoothly in an appropriately selected solvent.

A suitable concentration of the diisocyanate in the reaction mixture is 5 to 80% by weight. Within that range, the carbodiimidation reaction proceeds sufficiently while being controlled with ease.

Terminal blocking with a monoisocyanate can be performed by adding the monoisocyanate to the reaction system in the initial, middle or final stage of the carbodiimidation reaction or over the whole length of the carbodiimidation reaction time. The monoisocyanate is preferably an aromatic one.

Any known phosphorus type catalysts can be used as the catalyst for carbodiimidation. Suitable catalysts include phospholene oxides, such as 1-phenyl-2-phospholene 1-oxide, 3-methyl-2-phospholene 1-oxide, 1-ethyl-2-phospholene 1-oxide, and 3-methyl-1-phenyl-2-phospholene 1-oxide, and 3-phospholene isomers corresponding to these 2-phospholene oxides.

Known solvents (organic solvents) can be used to carry out the carbodiimidation reaction. Suitable solvents include halogenated hydrocarbons, such as tetrachloroethylene, 1,2-dichloroethane, and chloroform; ketones, such as acetone, methyl ethyl ketone, methyl isobutyl ketone, and cyclohexanone; cyclic ethers, such as tetrahydrofuran and dioxane; and aromatic hydrocarbons, such as toluene and xylene. The solvents can be used either singly or as a mixture two or more thereof. These solvents are also useful for re-dissolving the resulting polycarbodiimide.

The reaction end point can be confirmed by appearance of an absorption assigned to a carbodiimide structure (N=C=N) at 2140 $cm^{-1}$ and disappearance of an absorption attributed to the isocyanate at 2280 $cm^{-1}$ in infrared spectroscopy.

After completion of the carbodiimidation reaction, the resulting polycarbodiimide is usually obtained in a solution form. If desired, the polycarbodiimide solution may be poured into a poor solvent, such as methanol, ethanol, isopropyl alcohol or hexane, to precipitate the polycarbodiimide, which is separated from any unreacted monomer or the catalyst.

Where the polycarbodiimide once collected as a precipitate is re-dissolved in an organic solvent to prepare a solution, the precipitate is washed and dried in a usual manner before being re-dissolved, whereby a polycarbodiimide solution having improved storage stability can be prepared.

Where the polycarbodiimide solution as obtained contains a by-product, the solution can be purified by treating with an appropriate adsorbent for removing the by-product. Useful adsorbents include alumina gel, silica gel, activated carbon, zeolite, active magnesium oxide, activated bauxite, fuller's earth, activated clay, and molecular sieve carbon. These adsorbents can be used either singly or as a mixture of two or more thereof.

The polycarbodiimide for use in the invention can be obtained as described above. It is preferred for the polycarbodiimide thus prepared to have a main chain structure composed of an aromatic diisocyanate component and an aliphatic diisocyanate component and have its terminals blocked with an aromatic monoisocyanate residue so as to form a high refractive resin layer with a higher refractive index. From the same standpoint, it is still preferred that the main chain structure be composed of an aromatic diisocyanate component and blocked with an aromatic monoisocyanate residue.

More specifically, the polycarbodiimide is preferably such that at least 10 mol % (and up to 100 mo %) of the diisocyanate residues represented by R in formula (I) are aromatic and that the monoisocyanate residue represented by $R^1$ is aromatic. The aromatic diisocyanate residue is preferably of at least one kind selected from the group consisting of a tolylene diisocyanate residue, a 4,4'-diphenylmethane diisocyanate residue, and a naphthalene diisocyanate residue. The most preferred aromatic diisocyanate residue R is a naphthalene diisocyanate residue. The aromatic monoisocyanate residue $R^1$ is preferably a 1-naphthyl isocyanate residue.

The high refractive resin layer is formed by heat curing the polycarbodiimide as described below. The high refractive resin layer preferably has a refractive index of 1.70 or higher, particularly preferably from 1.70 to 1.85. The method of measuring the refractive index is described in Example 1 described below. The refractive index of the high refractive resin layer can be adjusted as desired by appropriately selecting the kind and the amount of the components constituting the polycarbodiimide, and the like.

FIG. 1 presents a cross-section of an example of the microlens array according to the invention. The microlens array shown in FIG. 1 comprises transparent substrates 1 having interposed therebetween a laminate of a high refractive resin layer 2 and a low refractive resin layer 3.

The structure of the microlens array of the invention is not limited to that shown in FIG. 1 and may be one that formation of the low refractive resin layer and/or the transparent substrate(s) is omitted.

The low refractive resin layer may be made from known resin commonly employed in microlens arrays, such as heat curing resins and UV curing resins. The low refractive resin layer usually has a refractive index of 1.5 or lower.

The resins which can be used to form the low refractive resin layer include polytrifluorochloroethylene, polyvinylidene fluoride, poly-4-methylpentene-1, cellulose acetate butyrate, polybutyl acrylate, polyvinyl acetate, polypropylene, cellulose acetate, polyoxymethylene, polymethyl methacrylate, polyvinyl alcohol, polyurethane, polyethylene, polyacrylonitrile, polymethacrylonitrile, polyisoprene, polyvinyl chloride, and epoxy resins. The low refractive resin layer can be formed by curing one or more resins selected from those recited above by a known method chosen according to the properties of the resin(s).

A process of producing the microlens array of the present invention will now be described with reference to the microlens array shown in FIG. 1.

Lamination of the high and low refractive resin layers can be carried out in a conventional manner used for a microlens array production. Conventional lamination methods applicable to the present invention include, but are not limited to, a method comprising the following steps (1) to (3). In what follows, reference is made to FIG. 2.

Step (1): Preparation of Polycarbodiimide Sheet

A polycarbodiimide solution is formed into a film with an appropriate thickness by any known technique, such as casting, spin coating or roll coating. The film (sheet) is usually dried at a temperature that causes the solvent to evaporate but does not cause the resin to cure. Such a temperature preferably ranges from 20° to 350° C., particularly 50° to 200° C. At 20° C. or higher temperatures, the resulting sheet would be highly reliable with no residual solvent. At 350° C. or lower temperatures, the resin solution would dry sufficiently without inducing resin curing.

Taking into account ease of subsequent stampering, the dry thickness of the sheet is preferably 30 to 250 $\mu$m.

Step (2): Stamping

Figure 2A:
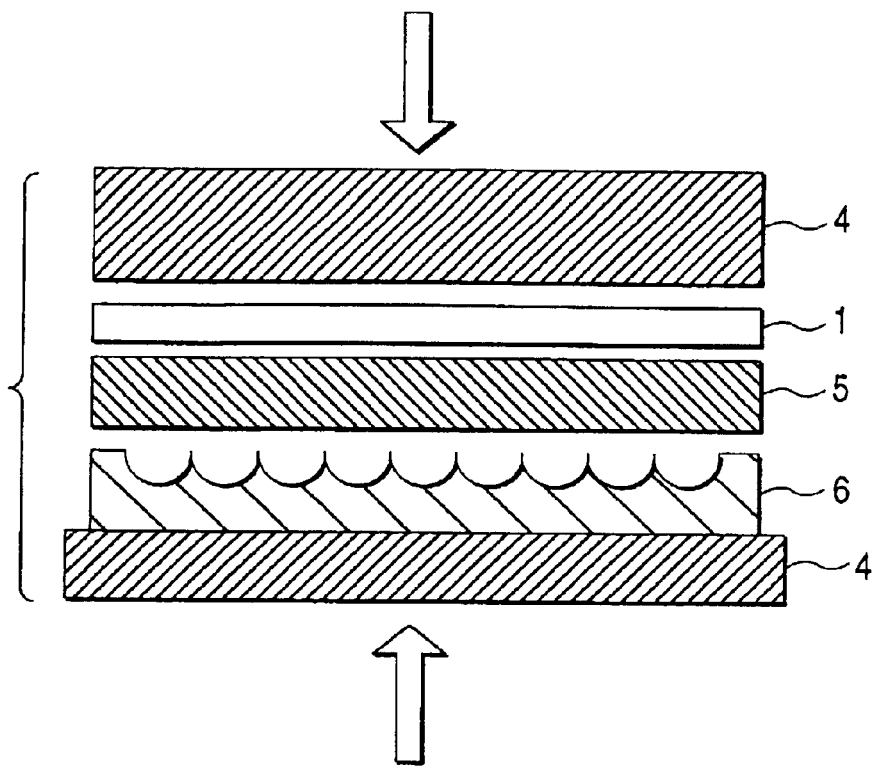
FIGS. 2A to 2C show the state of a microlens array of the present invention or a precursor thereof in steps involved in the production thereof.

As illustrated in FIG. 2A, the uncured polycarbodiimide sheet 5 and a transparent substrate 1 are sandwiched in between a metal press plate (hot metal press plate) 4 and a stamper 6 placed on another metal press plate 4. The resin sheet 5 and the substrate 1 may be separately disposed, or the resin sheet 5 may previously be adhered to the substrate 1 by heat and pressure application.

Figure 2B:
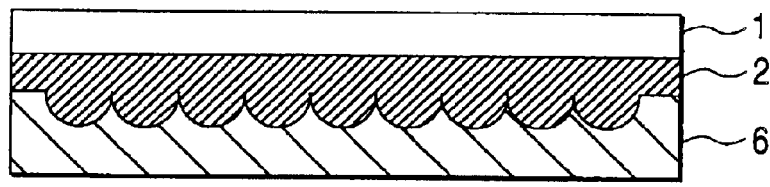

The resin sheet 5 and the substrate 1 are hot pressed in the directions shown by arrows to obtain a laminate of the substrate 1 and a high refractive resin layer 2 shaped into an array of convex microlenses as shown in FIG. 2B.

The hot pressing (stamping) is preferably carried out at a temperature of 100° to 250° C., particularly 120° to 200° C., under a pressure of 0.1 to 10 MPa, particularly 0.5 to 5 MPa, for a period of 5 seconds to 3 minutes, particularly 10 seconds to 1 minute. By being heated under pressure, the uncured polycarbodiimide 5 is cured and shaped.

Figure 2C:
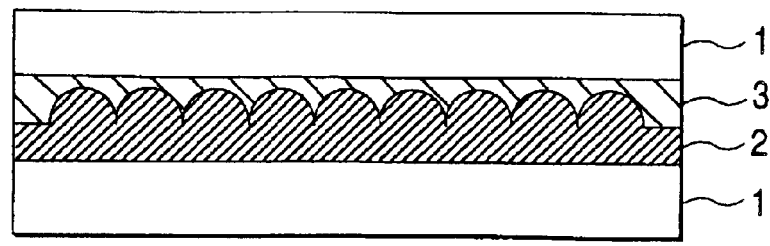

Step (3): Lamination of Low Refractive Resin Layer and Transparent Substrate on High Refractive Resin Layer The high refractive resin layer 2 on the transparent substrate 1 obtained in step (2) is laminated with (i) a resin sheet providing a low refractive resin layer 3 and another transparent substrate 1 or (ii) a laminate of another transparent substrate 1 and a resin sheet providing a low refractive resin layer 3 that have previously been adhered to each other by hot pressing. A microlens array shown in FIG. 2C is thus obtained.

According to the present invention, the high refractive resin layer comprises a cured product of the above-described polycarbodiimide. Therefore, even when combined with a conventional low refractive resin layer, the high refractive resin layer provides a refractive index difference preferably of 0.25 or greater, particularly 0.30 or greater, from the low refractive resin layer. This allows reduction of height of convexity of the convex lenses (or thickness of lenses). As a result, even with the thickness of the low refractive resin layer unchanged from conventional one, the microlens array of the invention can be made thinner than conventional ones.

The microlens array of the invention preferably has a light transmission of 80% or higher, particularly preferably 90% or higher, so as to minimize optical loss. The transmission of a microlens array is measured by the method described in Example 1 hereinafter given.

EXAMPLES

The present invention will be illustrated in greater detail with reference to the following Examples and Comparative Examples, but the invention should not be construed as being limited thereto.

Figure 3A:
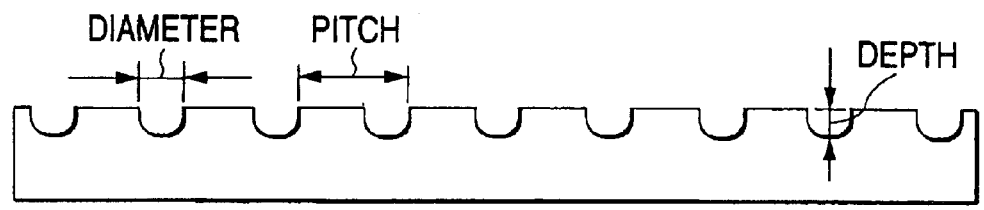
FIGS. 3A, 3B and 3C show a cross-section of the stamper used in the Examples and Comparative Examples, a cross-section of the high refractive resin layers of the microlens arrays produced in the Examples and Comparative Examples, and a cross-section of the microlens arrays produced in the Examples and Comparative Examples, respectively.
Figure 3B:
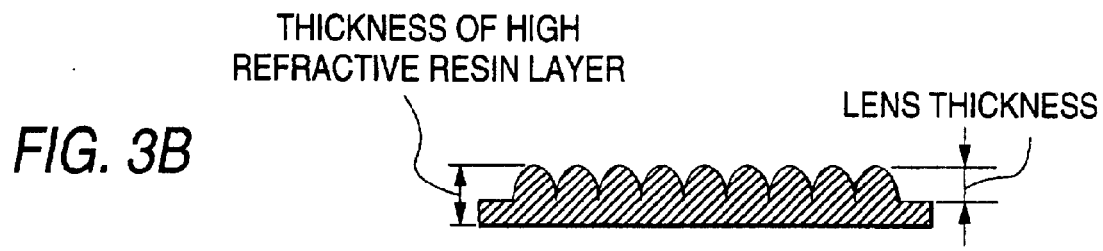
Figure 3C:
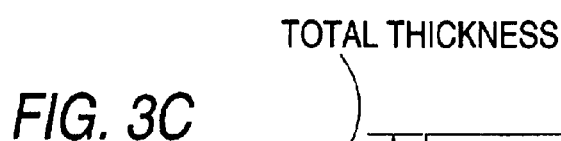

In the following Examples, synthesis reactions were conducted in a nitrogen stream. IR analysis was made with FT/IR-230 supplied by JEOL Ltd. FIGS. 3A, 3B, and 3C show a cross-section of the stamper used in the Examples and Comparative Examples, a cross-section of the high refractive resin layers of the microlens arrays produced in the Examples and Comparative Examples, and a cross-section of the microlens arrays produced in the Examples and Comparative Examples, respectively.

Example 1

In a 500 ml four-necked flask equipped with a stirrer, a dropping funnel, a reflux condenser, and a thermometer were put and mixed 29.89 g (171.6 mmol) of tolylene diisocyanate (T-80, an isomeric mixture available from Mitsui Takeda Chemicals, Inc.), 94.48 g (377.52 mmol) of 4,4'-diphenylmethane diisocyanate, 64.92 g (308.88 mmol) of naphthalene diisocyanate, and 184.59 g of toluene.

To the mixture were added 8.71 g (51.48 mmol) of 1-naphthyl isocyanate and 0.82 g (4.28 mmol) of 3-methyl-1-phenyl-2-phospholene 2-oxide. The mixture was heated to 100° C. while stirring and maintained at that temperature for 2 hours.

The progress of the reaction was confirmed by observing a decreasing absorption for the isocyanate (N—C—O) stretching vibration (at 2280 cm$^{-1}$) and an increasing absorption for the carbodiimide (N=C=N) stretching vibration (at 2140 cm$^{-1}$) by IR spectroscopy. Upon confirming the reaction end point by the IR analysis, the reaction mixture was cooled to room temperature to obtain a polycarbodiimide solution. The diisocyanate component of the polycarbodiimide was found to be 100% aromatic, and n in formula (I) was found to have a distribution ranging from 15 to 77.

The resulting polycarbodiimide solution was applied to a separator, a 50 μm thick fluorinated silicone-treated polyethylene terephthalate film available from Toray Industries, Inc. The applied solution was dried at 130° C. for 1 minute and then at 150° C. for 1 minute to prepare a sample film having a dry thickness of 50 μm. A 1 cm wide and 2 cm long specimen was cut out of the film and cured in a curing oven of 150° C. or a curing oven of 175° C. for 1 hour. The refractive index of the cured film at a wavelength of 589 nm was measured with a multi-wavelength Abbe refractometer Atago DR-M4. As a result, the refractive index of the specimen cured at 150° C. was 1.748, and that of the specimen cured at 175° C. was 1.744.

The sample film and a 0.25 mm thick silica plate (transparent substrate) were set between a stamper shown in FIG. 3A (concave diameter: 100 μm; pitch: 250 μm; depth: 10 μm) and a metallic press plate, and shaped at 200° C. and 1.5 MPa for 1 minute, followed by curing at 150° C. for 1 hour, to form a high refractive resin layer as shown in FIG. 3B. A UV curing epoxy resin (refractive index of a cured product: 1.46 (curing conditions: 30 mW/cm$^2$, 10 min)) forming a low refractive resin layer and the same silica plate as used above were superposed on the high refractive resin layer 2 in this order to obtain a microlens array having a lens thickness of 10 μm, a high refractive resin layer thickness of 30 μm (see FIG. 3B), and a total thickness of 550 μm (see FIG. 3C). The high refractive resin layer having a refractive index of 1.748, the difference in refractive index between the high and the low refractive resin layers was 0.288.

The light transmission of the microlens array was 84% as measured at 450 nm with a spectrophotometer MCPD-3000, supplied by Otsuka Electronics Co., Ltd.

Example 2

In a 500 ml four-necked flask equipped with a stirrer, a dropping funnel, a reflux condenser, and a thermometer were put and mixed 89.01 g (355.68 mmol) of 4,4'-diphenylmethane diisocyanate, 24.92 g (118.56 mmol) of naphthalene diisocyanate, 44.87 g (266.76 mmol) of hexamethylene diisocyanate, and 216.56 g of toluene.

To the mixture were added 7.52 g (44.46 mmol) of 1-naphthyl isocyanate and 0.71 g (3.705 mmol) of 3-methyl-1-phenyl-2-phospholene 2-oxide. The mixture was stirred at 25° C. for 3 hours and then heated up to 100° C. while stirring, at which the mixture was maintained for 2 hours.

Upon confirming the reaction end point by IR analysis in the same manner as in Example 1, the reaction mixture was cooled to room temperature to obtain a polycarbodiimide solution. The diisocyanate component of the polycarbodiimide was found to have an aromatic residue content of 64 mol %, and n in formula (I) was found to have a distribution ranging from 15 to 77.

A 50 μm thick film sample was prepared using the resulting polycarbodiimide solution in the same manner as in Example 1. The film sample was cured in the same manner as in Example 1. The samples cured at 150° C. and 175° C. were found to have a refractive index of 1.725 and 1.723, respectively, as measured in the same manner as in Example 1.

A microlens array was prepared in the same manner as in Example 1 (150° C., 1 hour cure). The high refractive resin layer having a refractive index of 1.725, the difference in refractive index between the high and the low refractive resin layers was 0.265. While the lens thickness and the high refractive resin layer thickness were equal to those in Example 1, the total thickness of the microlens array was 560 μm. The light transmission of the microlens array was 80%.

Comparative Example 1 and 2

A microlens array was prepared in the same manner as in Example 1, except for using α-naphthyl (meth)acrylate (refractive index of a cured product: 1.67) as the high refractive resin layer-forming material. The low refractive resin layer having a refractive index of 1.46 (the same as in Example 1), the difference in refractive index between the high and the low refractive resin layers was 0.21.

Microlens arrays with a varied lens thickness were prepared using stampers having various concave depths. From the results of measurement of light transmission at 450 nm, it was revealed that the microlens array had to have a lens thickness of 13 μm (total microlens array thickness: 560 μm) so as to have a transmission equal to that of Example 1 (i.e., 84%) (Comparative Example 1). In order for the microlens array to have a transmission equal to that of Example 2 (i.e., 80%), the lens thickness had to be 12.5 μm (total microlens array thickness: 570 μm) (Comparative Example 2).

As can be seen from the foregoing results, the present invention can provide a microlens array in which the lens thickness is reduced by 20% or more.

The present invention provides a microlens array with a reduced thickness compared with related art techniques. The microlens array of the invention is suitable for use in optoelectronic equipment such as CCD, liquid crystal projectors, camcorders, viewfinders, and portable TV sets.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2003-010408 filed Jan. 17, 2003, the content thereof being herein incorporated by reference.

What is claimed is:

1. A microlens array having a resin layer forming convex lenses, wherein the resin layer comprises a cured product of a polycarbodiimide resin represented by formula:

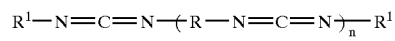

wherein R represents a diisocyanate residue; R$^1$ represents a monoisocyanate residue; and n represents an integer of 1 to 100.

2. The microlens array according to claim 1, wherein the resin layer has a refractive index of 1.70 or greater.

3. The microlens array according to claim 2, wherein the refractive index of the resin layer is from 1.70 to 1.85.

4. The microlens array according to claim 1, wherein the diisocyanate residue comprises aromatic diisocyanate residues in an amount of 10 mol % or higher.

5. The microlens array according to claim 4, wherein all the diisocyanate residues are aromatic diisocyanate residues.

6. The microlens array according to claim 1, wherein the diisocyanate residue comprises at least one member selected from the group consisting of a tolylene diisocyanate residue, a 4,4'-diphenylmethane diisocyanate residue, and a naphthalene diisocyanate residue.

7. The microlens array according to claim 6, wherein the diisocyanate residue comprises a naphthalene diisocyanate residue.

8. The microlens array according to claim 1, wherein the monoisocyanate residues are aromatic monoisocyanate residues.

9. The microlens array according to claim 8, wherein the aromatic monoisocyanate residues are 1-naphthyl isocyanate residues.

* * * * *